United States Patent [19]

Miranti, Jr.

[11] Patent Number: 4,629,444

[45] Date of Patent: * Dec. 16, 1986

[54] BELT PULLEY AND METHOD OF MAKING THE SAME

[75] Inventor: Joseph P. Miranti, Jr., Porter Township, Christian County

[73] Assignee: Dayco Corporation, Dayton, Ohio

[*] Notice: The portion of the term of this patent subsequent to Nov. 26, 2002 has been disclaimed.

[21] Appl. No.: 778,455

[22] Filed: Sep. 20, 1985

Related U.S. Application Data

[62] Division of Ser. No. 383,856, Jun. 1, 1982, Pat. No. 4,555,239.

[51] Int. Cl.$^4$ .............................. F16H 57/04
[52] U.S. Cl. .................. 474/93; 188/264 A; 192/113 A; 416/183; 474/188
[58] Field of Search ............ 474/93, 188; 188/264 A, 188/264 AA; 192/113 A, 113 R; 416/183, 185

[56] References Cited

U.S. PATENT DOCUMENTS

| | | | |
|---|---|---|---|
| 1,358,205 | 11/1920 | Heydon | 474/93 X |
| 1,372,700 | 3/1921 | Kimble | 474/93 |
| 1,385,396 | 7/1921 | Rayburn | 474/93 |
| 1,388,865 | 8/1921 | Kimble | 474/93 |
| 1,433,828 | 10/1922 | Kimble | 474/93 |
| 1,443,541 | 1/1923 | Kimble | 474/93 |
| 2,391,642 | 12/1945 | Reed | 474/188 X |
| 2,753,808 | 7/1956 | Kluge | 416/183 |
| 3,314,509 | 4/1967 | Pelikan | 188/264 A X |
| 3,372,645 | 3/1968 | Willi | 416/183 |
| 3,465,853 | 9/1969 | Zabalbeitia | 188/264 A X |
| 3,899,054 | 8/1975 | Huntress et al. | 192/113 A X |
| 3,993,415 | 11/1976 | Hauser | 416/93 R |
| 4,555,239 | 11/1985 | Miranti, Jr. | 474/93 |

FOREIGN PATENT DOCUMENTS

| | | | |
|---|---|---|---|
| 235701 | 9/1964 | Austria | 416/183 |
| 496820 | 12/1938 | United Kingdom | 416/183 |
| 671990 | 5/1952 | United Kingdom . | |
| 844385 | 8/1960 | United Kingdom . | |
| 865797 | 4/1961 | United Kingdom . | |
| 891375 | 3/1962 | United Kingdom . | |
| 911659 | 11/1962 | United Kingdom . | |
| 1338568 | 11/1973 | United Kingdom . | |
| 1501408 | 2/1978 | United Kingdom . | |

Primary Examiner—Kenneth J. Dorner
Assistant Examiner—Dwight G. Diehl
Attorney, Agent, or Firm—Joseph V. Tassone

[57] ABSTRACT

A belt pulley and method of making the same are provided, the pulley having a hub and a peripheral groove for receiving part of an endless belt therein that is to drive the pulley or be driven thereby whereby the pulley is adapted to be rotated about the axis of the hub. The pulley has a plurality of vanes extending outwardly from at least one of the opposed sides thereof, the vanes comprising a plurality of spaced apart curved vanes of substantially the same size and shape and disposed in a plurality of circular arrays that are generally concentrically disposed relative to each other about the axis and on the one side of the pulley for acting on fluid adjacent the pulley to tend to cool the pulley with the fluid. The curved vanes in each circular array are each disposed substantially evenly between an adjacent pair of curved vanes in the circular array adjacent thereto whereby the number of the curved vanes in each circular array is the same, each curved vane having a convex side and a concave side. The concave side of each curved vane generally faces the axis and is substantially non-symmetric about a radial line intersecting its midpoint and the convex side of each curved vane generally faces in the direction of the peripheral groove.

5 Claims, 12 Drawing Figures

BELT PULLEY AND METHOD OF MAKING THE SAME

CROSS REFERENCE TO RELATED APPLICATION

This application is a division of Ser. No. 383,856, filed June 1, 1982, now U.S. Pat. No. 4,555,239.

BACKGROUND OF THE INVENTION

1. Field of the Invention

This invention relates to an improved belt pulley and to a method of making such a belt pulley or the like.

2. Prior Art Statement

It is known to provide a belt pulley having a hub and a peripheral groove for receiving part of an endless belt therein that is to drive the pulley or be driven thereby whereby the pulley is adapted to be rotated about the axis of the hub, the pulley having vane means extending outwardly from at least one of the opposed sides of the pulley.

In one such prior known belt pulley, the vane means comprise a plurality of straight radially disposed vanes arranged in a spaced apart circumferential manner about the axis of the pulley.

In another such prior known belt pulley, the vane means merely comprise a plurality of spaced apart lug-like extensions that provide turbulence in the air adjacent that side of the pulley as the pulley rotates and therefore are not vanes in the true sense of a vane being fin-like.

It is also known to applicant to provide a belt pulley having a hub and a peripheral groove for receiving part of an endless belt therein that is to drive the pulley or be driven thereby whereby the pulley is adapted to be rotated about the axis of the hub, the pulley having means defining at least one passage means provided with an inlet adjacent the hub and an outlet adjacent the peripheral groove whereby fluid passing through the passage means from the inlet to the outlet thereof will tend to cool the pulley and/or the belt as the pulley rotates about the axis of the hub.

For example, see the copending patent application, Ser. No. 383,845, filed June 1, 1982, now U.S. Pat. No. 4,509,933, of Joseph P. Miranti, Jr., et al.

SUMMARY OF THE INVENTION

It is one feature of this invention to provide a belt pulley having improved means for cooling the same.

In particular, it is believed according to the teaching of this invention that an air flow can be forced over the side surface of the pulley in a manner similar to a fan by the attachment of a plurality of curved vanes or air foils to one or both sides of the pulley with such vane means on a particular side of the pulley being in a generally circular array about the axis of rotation of the pulley. In this manner, it is believed that the operating temperature of a belt utilized with such a pulley will be reduced and thereby have its belt life increased.

For example, one embodiment of this invention provides a belt pulley having a hub and a peripheral groove for receiving part of an endless belt therein that is to drive the pulley or be driven thereby whereby the pulley is adapted to be rotated about the axis of the hub, the pulley having vane means extending outwardly from at least one of the opposed sides of the pulley. The vane means comprises a plurality of spaced apart curved vanes disposed in at least one circular array about the axis on the one side of the pulley for acting on fluid adjacent the pulley to tend to cool the pulley with the fluid. The curved vanes in each circular array are each disposed substantially evenly between an adjacent pair of curved vanes in the circular array adjacent thereto whereby the number of the curved vanes in each circular array is the same, each curved vane having a convex side and a concave side. The concave side of each curved vane generally faces the axis and is substantially non-symmetric about a radial line intersecting its midpoint and the convex side of each curved vane generally faces in the direction of the peripheral groove.

Accordingly, it is an object of this invention to provide an improved belt pulley having one or more of the novel features of this invention as set forth above or hereinafter shown or described.

Another object of this invention is to provide an improved method of making such a belt pulley, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
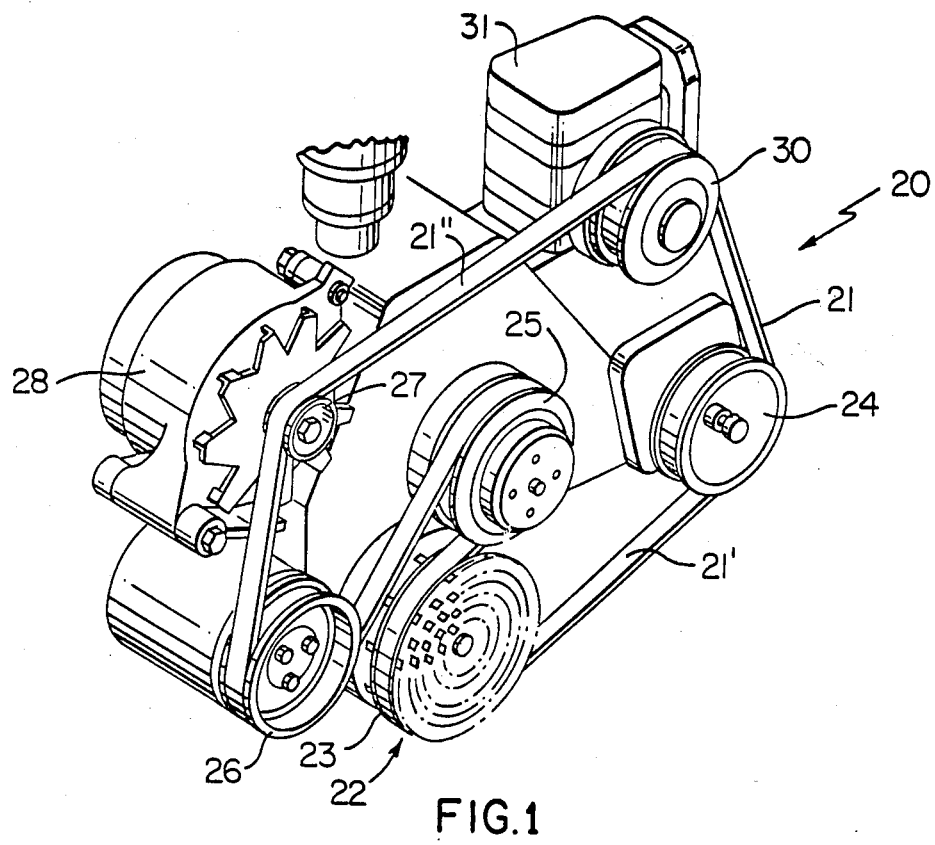
FIG. 1 is a fragmentary, isometric view looking toward the front end of an automotive engine which is adapted to utilize one of the pulleys of this invention, FIG. 1 illustrating one pulley of this invention.

While the various features of this invention are hereinafter illustrated and described as providing a belt pulley for a particular motor vehicle engine, it is to be understood that the various features of this invention can be utilized singly or in any combination thereof to provide a belt pulley for other belt systems as desired.

Therefore, this invention is not to be limited to only the embodiments illustrated in the drawings, because the drawings are merely utilized to illustrate one of the wide variety of uses of this invention.

Figure 2:
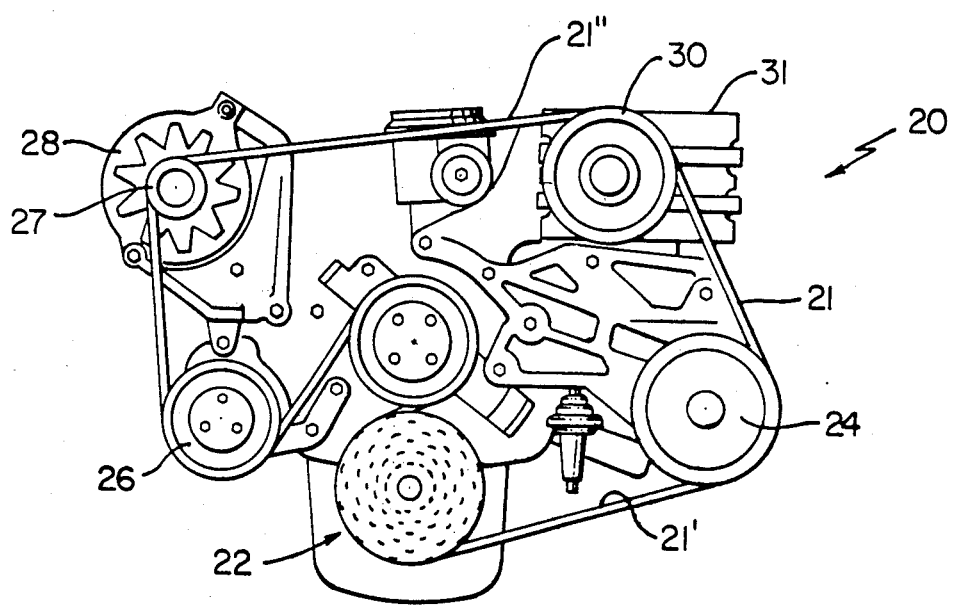
FIG. 2 is a view looking perpendicularly toward the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, one of the improved pulleys of this invention being generally indicated by the reference numeral 22 in FIGS. 3 and 4, as well as FIGS. 1 and 2, and being adapted to be utilized to provide a cooling effect on the belt 21 in a manner hereinafter set forth.

The endless power transmission belt 21 may be of any suitable type known in the art and is preferably made primarily of a polymeric material. The belt 21 in FIGS. 1 and 2 is of a generally rectangular cross-sectional configuration and has a bottom driving surface 21' and a top driving surface 21" in a manner well known in the art, the belt 21 being ribbed or non-ribbed as desired.

However, it is to be understood that the various features of this invention as hereinafter set forth are adapted to operate on belt constructions having other cross-sectional configurations whereby the pulleys of this invention illustrated in FIGS. 3–12 are illustrated as providing pulleys for belts that have a generally trapezoidal cross-sectional configuration as is well known for V-belt constructions with the understanding that the pulleys of this invention can be modified in a manner well known in the art to operate on belts of other cross-sectional configurations as desired.

The belt 21 is driven by a conventional pulley portion 23 of the pulley 22 of this invention which is operatively interconnected to the crankshaft of the engine 20 in a manner well known in the art whereby the pulley 22 is a driven sheave or pulley. The driving pulley 22 drives the belt 21 in an endless path and thereby drives a sheave or pulley 24 of a power steering device used in an automobile (not shown) utilizing the engine 20, a sheave or pulley 25 of an engine water pump, a sheave or pulley 26 of an air pump of a type used in an anti-pollution system for the engine 20, a sheave or pulley 27 of an engine electrical alternator 28 and a sheave or pulley 30 of a compressor 31 of an airconditioning system for the automobile utilizing the engine 20. All of the driven accessories, through their sheaves or pulleys 24, 25, 26, 27 and 30 impose a load on the belt 21 as is well known in the art whereby the same impose a heating load to the belt 21, the driving pulley 22 and engine 20 also imposing a heating load to the belt 21 as is well known in the art.

As previously stated, it is one feature of this invention to provide the pulley 22 with improved means that tend to cool the belt 21 during its operation and thereby extend its belt life.

In particular, the pulley 22 as illustrated in the drawings comprises a conventional pulley portion 23 and vane means that are generally indicated by the reference numeral 32 in the drawings and are believed to create fluid flow paths that are generally indicated by the reference numeral 33 in the drawings.

Figure 4:
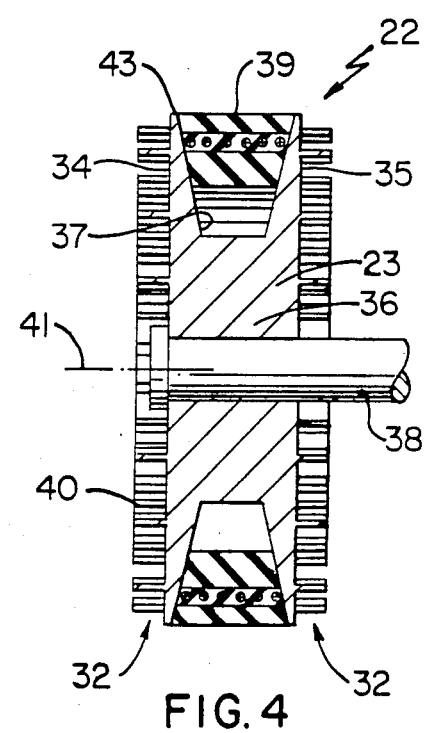
FIG. 4 is a cross-sectional view taken on line 4—4 of FIG. 3.

The pulley portion 23 has opposed substantially parallel flat sides 34 and 35 and is provided with a hub 36 and a peripheral groove 37, the hub 36 being adapted to be secured to a suitable drive or driven shaft 38 in a manner well known in the art while the peripheral groove 37 is adapted to receive part of an endless transmission belt therein in a manner well known in the art which comprises the belt 21 in FIGS. 1 and 2 and a V-belt 39 in FIG. 4.

Figure 3:
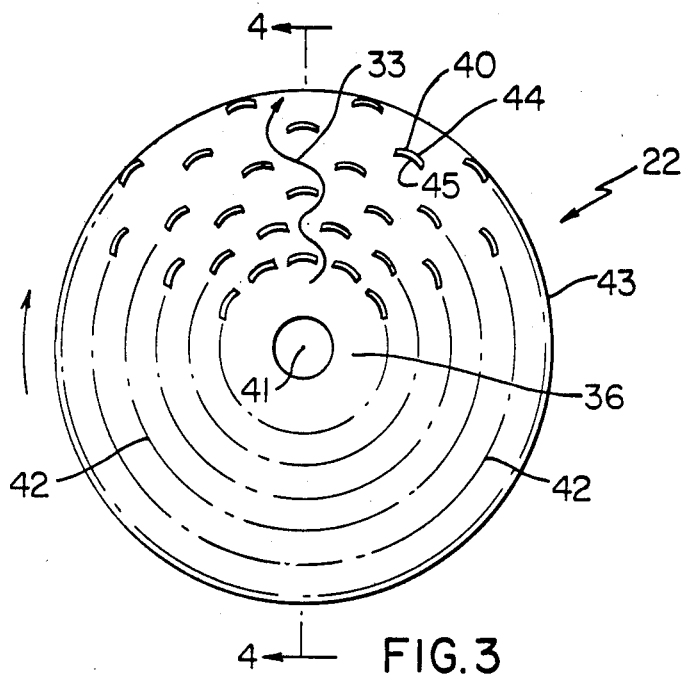
FIG. 3 is an enlarged side view of the pulley of this invention that is utilized in FIGS. 1 and 2.

The vane means 32 of the pulley 22 comprises a plurality of curved vanes 40 secured to the opposed sides 34 and 35 of the pulley portion 23 in the arrangement illustrated in FIG. 3 wherein the vanes 40 are disposed in circular arrays that are concentric to each other as well as to the axis 41 of the hub 36 as illustrated, each circular array of vanes 40 being indicated by reference numeral 42 in FIG. 3.

While a plurality of circular arrays 42 of curved vanes 40 are illustrated in FIG. 3 as being applied to the side 34 of the pulley 23, it is to be understood that the circular arrays 42 can extend from the hub 36 to the outer periphery 43 of the pulley portion 23 or that only a single circular array 42 need be provided and such vanes 40 could be disposed on only one side 34 or 35 of the pulley portion 23 if desired.

Nevertheless, when a plurality of circular arrays 42 are utilized for one or both sides of the pulley, such as illustrated in FIGS. 3 and 4, the vanes 40 in each circular array 42 can be disposed in offset relation to the vanes 40 in the circular arrays 42 adjacent thereto and, as illustrated in FIG. 3, the vanes 40 in a particular circular array 42 can be disposed evenly between the vanes 40 in a circular array 42 adjacent thereto as desired to cause the air flow paths 33 as will be apparent hereinafter.

Each vane 40 is relatively thin and has a convex side 44 and a concave side 45 with the concave side 45 generally facing toward the axis of rotation 41 of the pulley 22 while the convex side 44 thereof generally faces toward the outer periphery 43 of the pulley 22 and, thus, faces in the same direction as the direction of the peripheral groove 37 of the pulley portion 23 as illustrated in the drawings.

While the vanes 40 are illustrated as being integral and one-piece with the pulley portion 23, it is to be understood that the vanes 40 could be separately formed and then secured to the respective side 34 or 35 of the pulley portion 23 in any suitable manner.

Also, while the pulley portion 23 and vanes 40 can be formed of any suitable material, it is believed that the same should be formed of material having a high coefficient of heat conductivity, such as metallic material, in order to optimize the amount of cooling from the air flowing along the paths 33 in a manner now to be described.

In particular, as the pulley 22 is being rotated by the belt 39 or is being rotated by the shaft 38 as the case may be, the vanes 40 act on the fluid adjacent the pulley 22 and, in the case of the automobile engine 20, the air surrounding the pulley 22, and through the curved nature of the vanes 40 cause a turbulence in the air and cause the same to be moved generally radially outwardly along the surfaces 34 and 35 of the pulley portion 23. Because of the staggered relationship of the vanes 40 in the circular arrays 42, the air is caused to flow along the circuitous flow paths as represented by the arrow 33 in FIG. 3 rather than in a true radial direction although the resulting air flow direction is generally radially outwardly.

Thus, not only is it believed that a turbulence of the air will be created on the concave sides 45 of the vanes 40, but also it is believed that the vanes 40 will cause an outward flow of air along the paths 33 on the sides 34 and 35 of the pulley 23 whereby the constant flow of fresh air across the surfaces 34 and 35 of the pulley portion 23 will through conduction cool the pulley 22 and, thus, cool the belt 39 so that the pulley 22 will provide a cooling effect on the belt 39 in the operation of a system utilizing the pulley 22 and belt 39, such as the system illustrated in FIGS. 1 and 2.

It is also believed that by the vanes 40 creating the air flow along the paths 33 from the hub 36 of the pulley portion 23 to the outer periphery 43 thereof, there is also a centrifugal "pumping" effect created by the air moving radially outwardly beyond the outer periphery 43 of the pulley portion 23 so as to create a "Venturi" effect in substantially the same manner as set forth in the aforementioned copending patent application, Ser. No. 383,845, filed June 1, 1982, now U.S. Pat. No. 4,509,933, whereby this copending patent application is being incorporated into this disclosure by this reference thereto.

While the vanes 40 of the pulley 22 of this invention are each illustrated as being substantially concentric with the axis 41 of the pulley 22, it is to be understood that the vanes 40 could be angled at other desired angles to the axis 41 rather than being substantially concentric with the axis 41.

Figure 5:
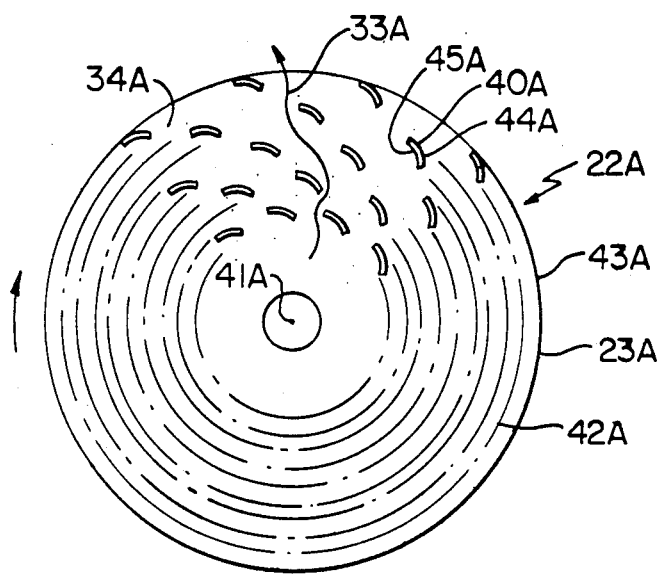
FIG. 5 is a view similar to FIG. 3 and illustrates another pulley of this invention.

For example, another pulley of this invention is generally indicated by the reference numeral 22A in FIG. 5 and parts similar to the pulley 22 previously described are indicated by like reference numerals followed by the reference letter "A".

As illustrated in FIG. 5, the pulley 22A comprises the conventional pulley portion 23A and has a plurality of curved vanes 40A at least on the side 34A thereof as illustrated in FIG. 5 with each vane 40A being angled other than concentric with the axis 41A of the pulley 22A while still being disposed in concentric circular arrays 42A as illustrated. However, the concave sides 45A of the vanes 40A still generally face toward the axis of rotation 41A while the convex sides 44A thereof generally face toward the outer periphery 43A of the pulley 22A.

Nevertheless, it is believed that rotation of the pulley 22A will cause the outward air flow along the paths 33A in substantially the same manner as the vanes 40 previously described.

Of course, various combinations of angles for the vanes 40 on a side of a pulley could be utilized, if desired, rather than having all of the vanes with the same angle relative to the axis of the pulley.

Also, while the pulleys 22 and 22A of this invention have been illustrated and described as merely respectively having the vanes 40 and 40A thereof provide for the cooling air flow in the manner previously described, it is to be understood that the various vane features of this invention can be utilized in combination with other means to further augment the cooling effect on the respective pulley.

For example, the vane means 32 of this invention can be utilized in combination with conventional or straight vanes.

Figure 6:
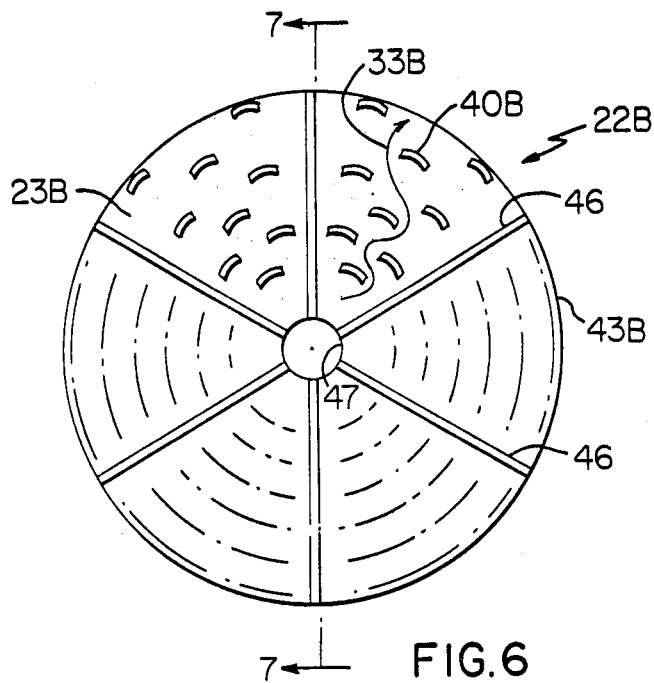
FIG. 6 is a view similar to FIG. 3 and illustrates another pulley of this invention.
Figure 7:
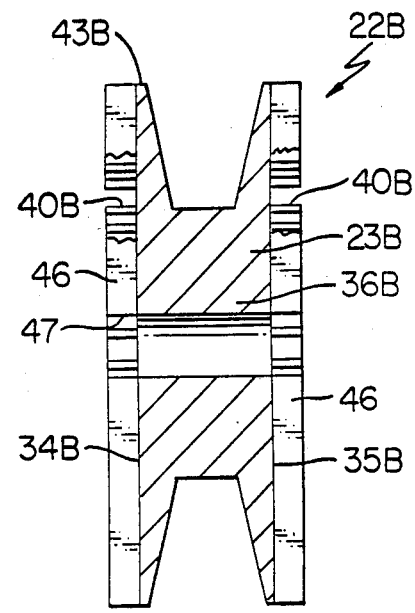
FIG. 7 is a cross-sectional view taken on line 7—7 of FIG. 6.

In particular, reference is now made to FIGS. 6 and 7 wherein another pulley of this invetnion is generally indicated by the reference numeral 22B and parts thereof similar to pulleys 22 and 22A previously described are indicated by like reference numerals followed by the reference letter "B".

As illustrated in FIGS. 6 and 7, the pulley 22B comprises a conventional pulley portion 23B having the opposed sides 34B and 35B not only carrying the curved vanes 40B of this invention in the same manner as the vanes 40 previously described, but also the sides 34B and 35B of the pulley portion 23B carry a plurality of radially disposed straight vanes or fins 46 that extend from the opening 47 through the hub portion 36B all the way to the outer periphery 43B of the pulley portion 23B, the vanes 46 being disposed circumferentially spaced from each other so that a plurality of curved vanes 40 of this invention are disposed between each adjacent pair of straight vanes 46 as illustrated in FIG. 6.

The pulley 22B operates in the same manner as the pulleys 22 and 22A previously described except that the straight vanes 46 cooperate with the vanes 40B in promoting the air flow radially outwardly, even though along the circuitous paths 33B for the reasons previously described through the so-called centrifugal "pumping" action, the centrifugal "pumping" action having been described in connection with the operation of the pulley 22.

Also, the vanes 40 and 40A of this invention could be utilized with the cooling passage means disclosed and claimed in the aforementioned copending patent application, Ser. No. 383,845, filed June 1, 1982, now U.S. Pat. No. 4,509,933, if desired.

Figure 8:
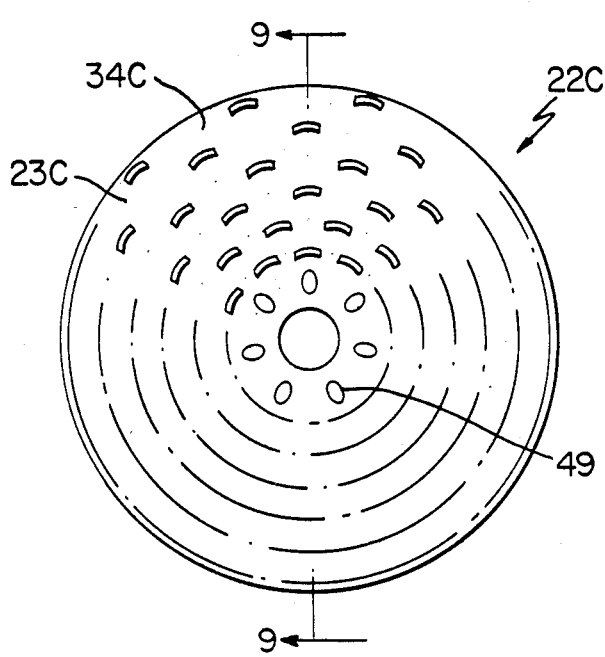
FIG. 8 is a view similar to FIG. 3 and illustrates another pulley of this invention.
Figure 9:
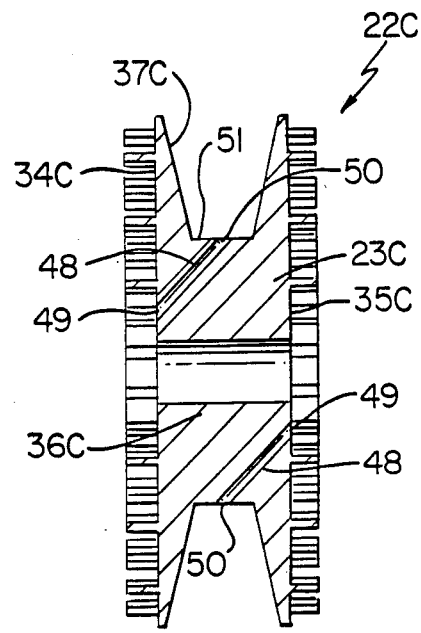
FIG. 9 is a cross-sectional view taken on line 9—9 of FIG. 8.

For example, reference is now made to FIGS. 8 and 9 wherein another pulley of this invention is generally indicated by the reference numeral 22C and parts thereof similar to pulleys 22, 22A and 22B previously described are indicated by like reference numerals followed by the reference letter "C".

As illustrated in FIGS. 8 and 9, it can be seen that the pulley 22C comprises the conventional pulley portion 23C having the opposed parallel flat sides 34C and 35C as well as the peripheral groove 37C and hub portion 36C.

The vane means 32C of this invention are disposed on the sides 34C and 35C thereof in the same manner as the vanes 40 previously described and thereby comprise the plurality of vanes 40C arranged in the circular arrays 42C for the reasons previously described.

In addition, the pulley portion 23C of the pulley 22C of this invention has a plurality of passages 48 provided therein with each passage 48 having an inlet 49 that interrupts the hub portion 36C of the pulley 22C and an outlet 50 that interrupts an annular surface 51 that defines the bottom of the peripheral groove 37C, the passages 48 being circumferentially disposed in spaced apart relation with a plurality of the passages 48 having their inlets 49 interrupting the side 34C of the pulley portion 23C while another set of a plurality of circumferentially arranged passages 48 have their inlets 49 interrupting the hub portion 36C of the pulley portion 23C at the side 35C thereof. The passages 48 that interrupt the side 34C can be in staggered relation relative to the passages 48 that interrupt the side 35C thereof as illustrated.

As fully set forth in the aforementioned copending patent application, Ser. No. 383,845, filed June 1, 1982, now U.S. Pat. No. 4,509,933, rotation of the pulley 22C causes air to enter the inlets 49 of the passages 48 and flow through the same to the outlets 50 to not only cool the pulley portion 23C by conduction, but also such exiting air from the outlets 50 of the passages 48 will impinge directly on the belt received in the peripheral groove 37C to further cool the same, such air movement through the passages 48 resulting from the centrifugal action and "Venturi" effect created by the outlets 50 being outwardly disposed relative to the inlets 49.

Thus, it can be seen that as the pulley 22C rotates, the vanes 40C of this invention promote the air flow across the sides 34C and 35C of the pulley portion 23C along the paths 33C to provide a cooling effect for the pulley 22C as previously described while the passages 48 additionally provide a cooling effect for the pulley 23C as well as directly on the belt in the peripheral groove 37C as set forth in the aforementioned copending patent application.

It is also believed that a cover means could be utilized with any of the various pulleys of this invention in a manner to be carried by the respective pulley in spaced relation to the adjacent side thereof that has the curved vanes of this invention thereon whereby the curved vanes will extend between that side of the pulley and the cover means to act on the fluid that enters the space or passage means between the cover means and the respective side of the pulley through suitable inlet means of the cover means, such fluid flowing out suitable outlet means of the cover means in much the same manner as set forth in the aforementioned copending patent application.

Figure 10:
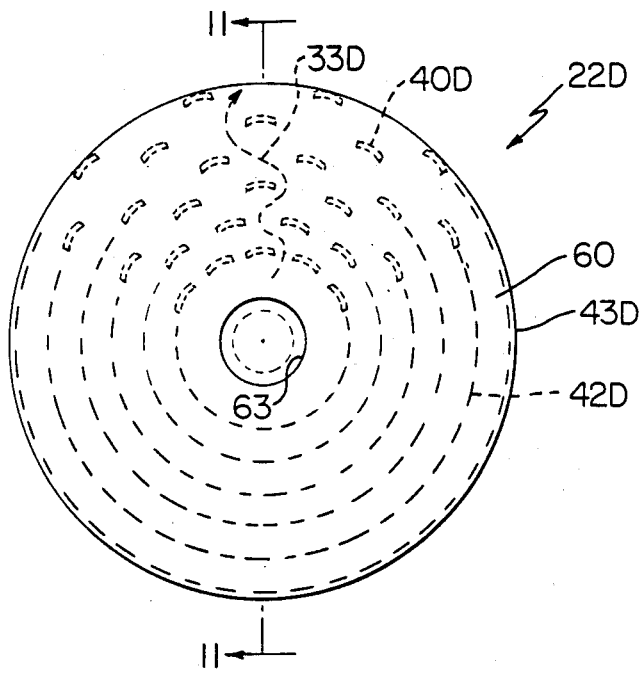
FIG. 10 is a view similar to FIG. 3 and illustrates another pulley of this invention.
Figure 11:
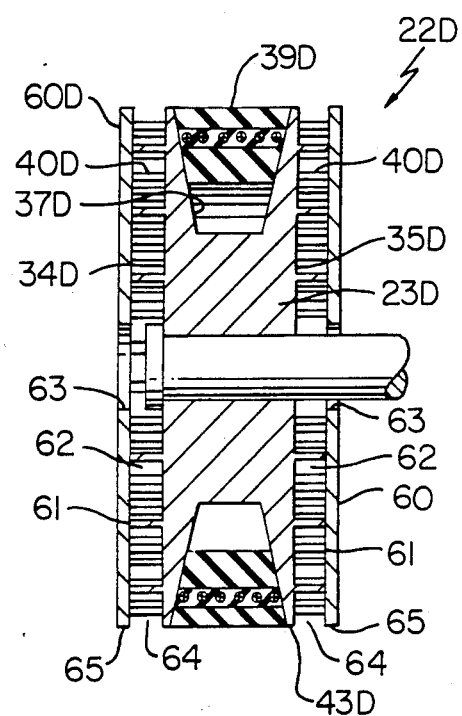
FIG. 11 is a cross-sectional view taken on line 11—11 of FIG. 10.

In particular, reference is now made to FIGS. 10 and 11 wherein another pulley of this invention is generally indicated by the reference numeral 22D and parts thereof similar to the pulleys 22, 22A, 22B and 22C are indicated by like reference numerals followed by the reference letter "D".

As illustrated in FIGS. 10 and 11, the pulley 22D includes the conventional pulley portion 23D having the curved vanes 40D of this invention extending from the opposed sides 34D and 35D thereof in the circular arrays 42D previously described. In addition, the pulley 22D of this invention includes a pair of cover means or plates 60 respectively secured to the outer free ends 61 of the vanes 40D so as to be disposed spaced from the sides 34D and 35D of the pulley 23D while being carried thereby, the plates 60 cooperating with the sides 34D and 35D of the pulley 23D to define passage means or spaces 62 therebetween that respectively have inlets 63 defined by openings passing centrally through the plates 60 and outlets 64 defined by the outer peripheries 65 of the respective plates 60 and the outer periphery 43D of the pulley 23D.

In this manner, it can be seen that at least one curved vane or fin 40D of this invention is disposed in each passage means 62 to act on the fluid flow therethrough in the manner previously described, the fluid flow through the passage means 62 being believed to be created by a centrifugal force and Venturi effect as the fluid in the passage means 62 will be thrown radially outwardly by the rotating pulley 22D and thereby draw fresh fluid in through the openings 63 as the fluid flow leaves the outlet means 64.

Therefore, it can be seen that as the pulley 22D rotates, the fins 40D act on the fluid in the passage means 62 to cause the same to flow radially outwardly along the circuitous paths 33D in the manner previously described to cool the pulley 22D and, thus, the belt 39D operating in the peripheral groove 37D thereof for the reasons previously set forth.

If desired, the pulley 22D previously described can also have the substantially straight radially disposed vanes 46 of FIGS. 6 and 7 cooperating with the curved vanes or fins 40D in such a manner that a plurality of circumferentially spaced apart passage means are provided between the cover means 60 and the respective pulley side wall.

Figure 12:
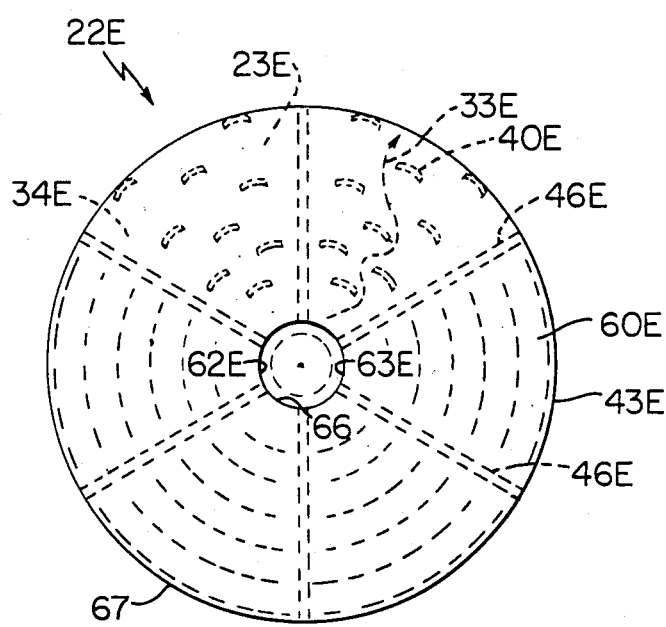
FIG. 12 is a view similar to FIG. 3 and illustrates another pulley of this invention.

For example, reference is now made to FIG. 12 wherein another pulley of this invention is generally indicated by the reference numeral 22E and parts thereof similar to the pulleys 22, 22A, 22B, 22C and 22D are indicated by like reference numerals followed by the reference letter "E".

As illustrated in FIG. 12, it can be seen that a plurality of radially disposed vanes 46E are carried at least on one side 34E of the pulley 23E that has the curved vanes 40E thereof, the straight radially disposed vanes 46E completely extending between the side 34E and the cover means 60E that can be secured to the vanes 46E as well as the vanes 40E.

In this manner, a plurality of passages 62E are provided in a circumferential manner about the pulley 22E with each passage 62E having its inlet 66 disposed in fluid communication with the central opening 63E in the plate 60E and having its outlet 67 disposed at the outer periphery 43E of the pulley 22E.

In any event, it can be seen that at least one curved vane 40E of this invention is disposed in each passage 62E to act on the fluid passing therethrough to cause the fluid to move radially outwardly along the circuitous path 33E for the reasons previously set forth.

While the pulleys 22D and 22E have been illustrated and described as having the inlets for the respective ventilating passages 62 and 62E adjacent the respective hubs thereof while the outlets are respectively disposed adjacent the respective peripheral grooves thereof, it is to be understood that the fluid flow through the passages 62 and 62E could occur in a reverse direction therethrough. For example, the pulley system could be mounted in a chamber that is supplied fluid under pressure while the hub of the pulley is vented to the atmosphere or to a chamber having a lower pressure so that the fluid will flow in opposition to the centrifugal force created by the rotating pulley from the outer periphery of the passages to the inner periphery thereof for the aforementioned cooling purposes. Therefore, while the terms "inlet" and "outlet" have been previously utilized in the specification and in the following claims to designate the openings of the passages respectively adjacent the hub and peripheral groove of the pulley, it is to be understood that the inlet for each passage means could be disposed adjacent the peripheral groove while the respective outlet thereof is disposed adjacent the hub whereby it is to be understood that in this description and in the following claims, the term "inlet" can be substituted for the word "outlet" and the term "outlet" can be substituted for the word "inlet" for each of the passage means set forth herein. Also, the vanes of the various pulleys 22, 22A, 22B, 22C, 22D and 22E of this invention could be shaped and disposed to tend to promote fluid flow from the outer periphery of the respective pulley toward the hub thereof.

It is also to be understood that through suitable shaping or directing of the outlets of the vanes and/or passage means of the pulleys of this invention, the fluid leaving such vanes and/or outlets of the passage means can be directed to directly engage against the belt of the respective pulley so as to further tend to cool the same. For example, suitable shrouding can be provided either integral with the pulley or separate therefrom for directing the flow from the vanes and/or outlets of the passages thereof directly against the belt operating with such pulley.

Therefore, it can be seen that this invention not only provides improved belt pulleys, but also this invention provides improved methods of making such belt pulleys.

While the forms and methods of this invention now preferred have been illustrated and described as required by the Patent Statute, it is to be understood that other forms and method steps can be utilized and still fall within the scope of the appended claims.

What is claimed is:

1. In a belt pulley having a hub and a peripheral groove for receiving part of an endless belt therein that is to drive said pulley or be driven thereby whereby said pulley is adapted to be rotated about the axis of said hub, said pulley having opposed sides, said pulley having vane means extending outwardly from at least one of said sides thereof, the improvement wherein said vane means comprise a plurality of spaced apart curved vanes of substantially the same size and shape and disposed in a plurality of circular arrays that are generally concentrically disposed relative to each other about said axis on said one side of said pulley for acting on fluid adjacent said pulley to tend to cool said pulley with said fluid, said curved vanes in each circular array each being disposed substantially evenly between an adjacent pair of curved vanes in the circular array adjacent thereto whereby the number of curved vanes in each circular array is the same, each curved vane having a convex side and a concave side, said concave side of each curved vane generally facing said axis, each curved vane being substantially nonsymmetric about a radial line intersecting its midpoint, said convex side of each curved vane generally facing in the direction of said peripheral groove.

2. A belt pulley as set forth in claim 1 wherein said pulley has means defining at least one passage means provided with an inlet adjacent said hub and an outlet adjacent said peripheral groove whereby fluid passing through said passage means from said inlet to said outlet thereof will tend to cool said pulley and/or said belt as said pulley rotates about said axis.

3. A belt pulley as set forth in claim 2 wherein said passage means has said outlet thereof in fluid communication with said peripheral groove.

4. A belt pulley as set forth in claim 3 wherein said passage means has said inlet thereof interrupting said hub.

5. A belt pulley as set forth in claim 1 and including a cover means carried by said pulley in spaced relation to said one side thereof, said vanes extending between said one side of said pulley and said cover means.

* * * * *